United States Patent Office 3,308,102
Patented Mar. 7, 1967

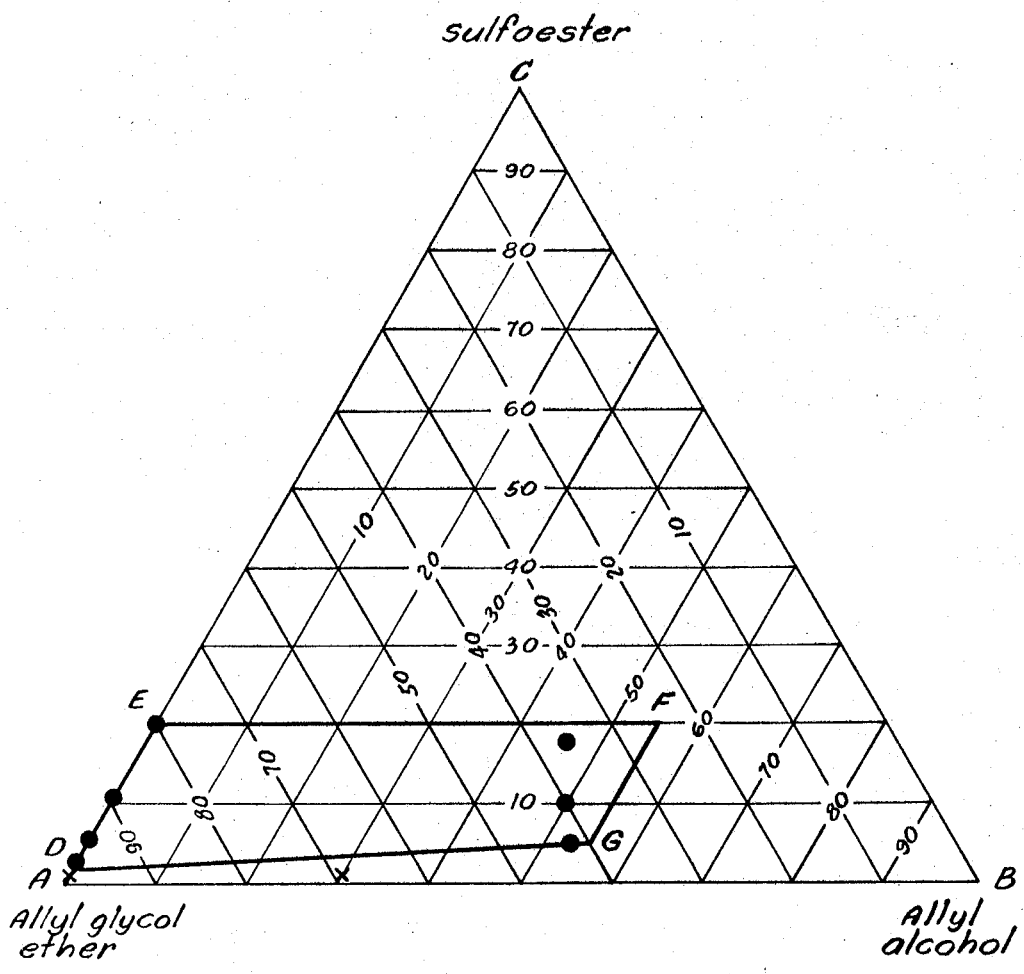

3,308,102
POLYSULFONE FLOCCULANTS
Billy W. Wilson, Lake Jackson, Tex., assignor to The Dow Chemical Company, Midland, Mich., a corporation of Delaware
Filed May 8, 1964, Ser. No. 365,963
4 Claims. (Cl. 260—79.3)

This invention relates to water-soluble copolymers useful as flocculants and more particularly to new polymers of sulfur dioxide and a monoallyl ether of a polyoxyethylene glycol having copolymerized therewith a limited amount of water-soluble sulfoester of an α-methylenecarboxylic acid having the formula:

$$CH_2=CR-CO_2-Q-SO_3M \quad (I)$$

wherein R is hydrogen, methyl or ethyl, Q is a $C_2$ to $C_6$ alkylene radical, and M is a monovalent cation.

The synthesis of high molecular weight polysulfones by the condensation of sulfur dioxide and ethylenically unsaturated monomers in the presence of suitable catalysts has long been known. These polymers contain substantially equimolar quantities of sulfur dioxide and one or more ethylenic monomers. Included among the monomers which have been used are mono- and diolefins such as ethylene, propylene, cyclohexene, styrene, butadiene and isoprene, and also polyfunctional monomers such as allyl alcohol, allyl ether, acrylic acid and acrylonitrile. While by appropriate choice of monomers, water-soluble polysulfones have been prepared, prior to the present invention these polymers have not been suitable as flocculants.

It has now been discovered that copolymerization of a limited amount of a water-soluble sulfoester of an α-methylenecarboxylic acid with a monoallyl ether of a polyoxyethylene glycol (hereinafter referred to as allyl glycol ether) and sulfur dioxide yields new water-soluble copolymers having useful activity as flocculants. It has further been discovered that a greater amount of the sulfoesters can be effectively incorporated in the sulfone polymer by dilution of the allyl glycol ether with allyl alcohol.

More specifically, the present invention concerns polysulfones comprising in substantially equimolar proportions:

(A) Sulfur dioxide and
(B) A mixture of ethylenically unsaturated monomers consisting of:
(1) 2 to 20 mole percent of a water-soluble sulfoester of an α-methylenecarboxylic acid of Formula I,
(2) 25 to 98 mole percent of a monoallyl ether of a polyoxyethylene glycol, said ether having an average molecular weight from about 200 to 1,000, and
(3) 0 to 55 mole percent of allyl alcohol.

These polysulfones are further characterized by recurring ethylenesulfone moieties of the formulas:

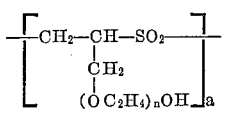 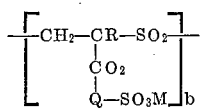

wherein each n is an interger from 0 to 25, and the ratio of a and b is consistent with initial monomer composition.

A critical element in the present invention is the incorporation of a water-soluble sulfoester of an α-methylenecarboxylic acid of the formula:

$$CH_2=CR-CO_2-Q-SO_3M \quad (I)$$

wherein R is hydrogen, methyl or ethyl, Q is a $C_2$ to $C_6$ alkylene radical, and M is a monovalent cation. These sulfoesters are fully described by Le Fevre and Sheetz in United States Patent 3,024,221 which is incorporated herein by reference. They can be prepared by reaction of an α-methylenecarboxylic acid or acid chloride, such as acrylic acid, methacrylic acid, or methacrylyl chloride, with a hydroxyalkylenesulfonic acid such as isethionic acid. The free sulfonic acids (I, M=H) are generally water-soluble liquids which form crystalline solid salts when neutralized with a base such as ammonia, sodium hydroxide, potassium carbonate, trimethylamine. Particularly suitable for use herein are the sulfoester salts with a monovalent cation derived from a water-soluble base.

The flocculant activity of these new polysulfones is related to the sulfoester content. As little as 2 mole percent of sulfoester based on the total ethylenically unsaturated monomer (B) results in significant flocculant activity, but in general it is not desirable to use more than 20 mole percent of the sulfoester. Within these limits the amount of sulfoester which can be effectively incorporated in the polysulfone also depends on the amount of allyl alcohol intermixed with the allyl glycol ether. For example, useful flocculants are prepared using from about 0.8 to 8.0 parts of sodium sulfoethyl acrylate with 100 parts of an allyl glycol ether having an average molecular weight of 500. By diluting the 100 parts of allyl glycol ether with 15 parts of allyl alcohol, up to 20 parts of sodium sulfoethyl acrylate can be incorporated to give a polysulfone with useful flocculant activity.

The remaining 80 to 98 mole percent of the initial ethylenically unsaturated monomer (B) is a water-soluble monoallyl ether of a polyoxyethylene glycol or a mixture thereof with allyl alcohol. These monoallyl glycol ethers are readily obtained by the base catalyzed addition of ethylene oxide to allyl alcohol in a conventional manner. Suitable for use herein are water-soluble, liquid monoallyl ethers of a polyoxyethylene glycol having an average molecular weight of about 200 to 1,000, and preferably about 400 to 700. By dilution of the allyl glycol ether with up to about 15 to 20 percent by weight of allyl alcohol, the amount of sulfoester which can be effectively incorporated in the polymer can be increased. However, at least 25 mole percent of allyl glycol ether based on the total ethylenically unsaturated monomer is required to achieve useful flocculation.

The composition of the initial ethylenically unsaturated monomer mixture (B) used herein is more fully defined with reference to the ternary composition diagram in the figure in which Apex C represents 100 mole percent of sulfoester, Apex A, 100 mole percent of the allyl glycol ether and Apex B, 100 mole percent of allyl alcohol. Effective polysulfone flocculants are obtained by copolymerization of an ethylenically unsaturated monomer mixture having a composition falling within the area DEFG as defined by the points:

| Points | Composition, Mole Percent | | |
| --- | --- | --- | --- |
| | Sulfoester | Allyl Glycol Ether | Allyl Alcohol |
| D | 2 | 98 | 0 |
| E | 20 | 80 | 0 |
| F | 20 | 25 | 55 |
| G | 5 | 40 | 55 | with sufficient sulfur dioxide to give a polymer containing a substantially equimolar amount of copolymerized sulfur dioxide. To achieve this result, the mole ratio of sulfur dioxide (A) to total ethylenically unsaturated monomer (B) should be at least 1 and advantageously between 1 and 10. Normally a mole ratio of about 1.1 to 3.0 is preferred.

The copolymerization is advantageously achieved by bulk polymerization of the mixed monomers although it can also be achieved in aqueous emulsion or with excess sulfur dioxide as a diluent. Catalysts which are employed include potassium persulfate, hydrogen peroxide, peracetic acid, organic peroxides, alkali metal and ammonium nitrates, and other similar oxidizing agents. Polymerization occurs readily at temperatures ranging from about −10° to 65° C. and preferably between about 25° and 50° C. with a reaction time of from 1 to 20 hours. Sufficient pressure is employed to maintain the reaction mixture substantially completely in a liquid phase. The resulting polysulfones are viscous, sticky polymers which dissolve slowly in water. For convenience, these polysulfone flocculants are generally handled and used as 5 to 15 percent aqueous solutions.

In summary, new and useful polysulfone flocculants have been prepared by copolymerizing a water-soluble sulfoester of an α-methylenecarboxylic acid with a monoallyl ether of a polyoxyethylene glycol and sulfur dioxide. Not only are these polysulfones effective as flocculants, but the ease of synthesis from readily available reactants is a further significant feature.

To illustrate further the invention described herein, the following examples are presented. Except as otherwise stated, all parts and percentages are by weight.

*Example 1.—Polysulfone*

To 100 parts (0.20 mole) of a monoallyl glycol ether prepared by the addition of ethylene oxide to allyl alcohol to give a glycol ether having an average molecular weight of 500, was added 15 parts (0.26 mole) of allyl alcohol, 20 parts (0.10 mole) of sodium sulfoethyl acrylate, and 2 parts of lithium nitrate in 8 parts of water. The monomer mixture was cooled to −5° C. and 48 parts (0.75 mole) of liquid sulfur dioxide was added. The reactor was sealed and the reactants heated with agitation at 38° C. for about 20 hours. The polymeric product was a thick, sticky polymer which dissolved slowly in water. A 1% solution had a consistency similar to glycerine.

*Example 2.—Flocculation test*

The polysulfones were tested for flocculant activity using a standard, finely ground (−200 to −300 mesh) composite inorganic material. A mixture of 5.0 g. of the standard powder was placed in a 100 ml. graduated cylinder and tap water added to a total volume of 100 ml. The mixture was shaken intermittently for 30 minutes. Then a 1 ml. aliquot of a dilute aqueous solution of the test polymer was added, thoroughly intermixed and the time required for the flocculated slurry to fall below the 50 ml. mark of the graduate determined. The clarity of the overhead liquid was also noted.

Typical results for the polysulfone described in Example 1 (PS–1) are given in Table 1. For the purpose of comparison, commercial polyacrylamide and sodium polystyrene sulfonate flocculants were also tested in a similar manner. While PS–1 is not as effective in this test as the commercial products, it does have very significant and useful activity.

TABLE 1.—POLYSULFONE FLOCCULANT

| Polymer | Polymer Concentration [a] | | Flocculant Activity Settling Rate; Overhead |
|---|---|---|---|
| | P.p.m. | Lbs./ton | |
| PS–1 | 100 | 0.2 | 4.8 in./min.; cloudy. |
| PS–1 | 200 | 0.4 | 6.1 in./min.; clear. |
| PS–1 | 300 | 0.6 | 5.5 in./min.; clear. |
| Polyacrylamide | 100 | 0.2 | 9.0 in./min.; clear. |
| Sodium polystyrene sulfonate | 100 | 0.2 | 15.0 in./min.; clear. |

[a] Based on total test solids.

*Example 3.—Sulfoester content*

Using the general process of Example 1, a series of polysulfones were prepared from the allyl glycol ether (AGE) with M.W. 500 and varying amounts of sodium sulfoethyl acrylate (NaSEA). In some runs methyl ethyl ketone hydroperoxide was used as the catalyst. The flocculant activity of the resulting copolymers was determined as described in Example 2. From typical results, such as given in Table 2, it is evident that maximum flocculant activity in the absence of added allyl alcohol occurs with about 2.0 to 5.0 wt. percent NaSEA based on total polymer solids or about 4 to 13 mole percent based on total ethylenic monomer.

TABLE 2.—SULFOESTER CONTENT

| Polymer | Ethylenic Monomers, Mole Percent | | Flocculant Activity [a] Settling Rate; Overhead |
|---|---|---|---|
| | NaSEA | Allyl Ester | |
| PS–3.1 | 1 | 99 | Very slow. |
| PS–3.2 | 2.5 | 97.5 | <2.0 in./min. |
| PS–3.3 | 5.5 | 94.5 | 5.0 in./min.; sl. cloudy. |
| PS–3.4 | 11 | 89 | 5.2 in./min.; cloudy. |
| PS–3.5 | 20 | 80 | 3.75 in./min.; cloudy. |

[a] 100 p.p.m. polymer, total solids basis.

Generally similar results are obtained with other allyl glycol ethers having an average molecular weight between about 200 and 1,000, although somewhat greater amounts of sulfoester can be incorporated effectively with the lower molecular weight allyl glycol ether. Also similar active polysulfone flocculants are obtained by substituting sodium sulfoethyl methacrylate for the sodium sulfoethyl acrylate.

*Example 4.—Addition of allyl alcohol*

Another series of polysulfones was prepared using the general process of Example 1 with the addition of varying amounts of allyl alcohol as a third ethylenic monomer. Typically, to a mixture of 200 pts. (0.40 mole) of monoallyl ether of polyoxyethylene glycol (M.W. 500), 29 pts. (0.50 mole) of allyl alcohol, 20 pts. (0.10 mole) of sodium sulfoethyl acrylate, 4 pts. of lithium nitrate and 8 parts of water was added 64 parts (1.00 mole) of sulfur dioxide. After heating at 38° C. for 16 hours, a sticky, stringy water-soluble polysulfone (PS–4.3) was obtained. When tested as a flocculant at a concentration of 100 p.p.m. total solids basis, PS–4.3 produced large flocs with a settling rate of 4.8 in./min. and a fairly clear overhead liquor.

Other compositions are given in Table 3. While addition of allyl alcohol increases the effective level of sodium sulfoethyl acrylate which can be incorporated in the polysulfone, it was also noted that the polysulfones containing higher amounts of allyl alcohol were somewhat less water-soluble.

TABLE 3.—ADDITION OF ALLYL ALCOHOL

| Polymer | Ethylenic Monomers, Mole Percent | | | Flocculation Activity [a] Settling Rate; Overhead |
|---|---|---|---|---|
| | NaSEA | Allyl Ether | Allyl Alcohol | |
| PS–4.1 | 1 | 69 | 30 | Very slow. |
| PS–4.2 | 5 | 42 | 53 | Slow. |
| PS–4.3 | 10 | 40 | 50 | 4.8 in./min.; clear. |
| PS–4.4 | 18 | 36 | 46 | 4.8 in./min.; cloudy. |

[a] 100 p.p.m. polymer, total solids basis.

I claim:

1. A water-soluble resinous polysulfone comprising in substantially equimolar quantities:
   (A) Sulfur dioxide and
   (B) A mixture of ethylenically unsaturated monomers consisting of:
      (1) 2 to 20 mole percent of a water-soluble sulfoester of an α-methylene-carboxylic acid having the formula:

$$CH_2=CR-CO_2-Q-SO_3M$$

wherein:
R is one of hydrogen, methyl and ethyl,
Q is a $C_2$ to $C_6$ alkylene radical, and
M is a monovalent cation;
(2) 25 to 98 mole percent of a monoallyl ether of a polyoxyethylene glycol, said ether having an average molecular weight in the range from about 200 to 1,000; and
(3) 0 to 55 mole percent of allyl alcohol; the proportions of these ethylenically unsaturated monomers being further defined as falling with the DEFG of the accompanying figure, said polysulfone being characterized by recurring ethylenesulfone moieties of the formula:

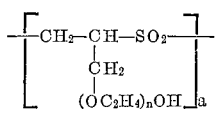 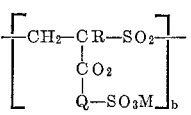

wherein each $n$ is an integer from 0 to 25, and the ratio of $a$ and $b$ is consistent with initial monomer composition as defined by the area DEFG.

2. The water-soluble polysulfone of claim 1 wherein the sulfoester is sodium sulfoethyl acrylate.

3. The water-soluble polysulfone of claim 1 wherein the sulfoester is sodium sulfoethyl methacrylate.

4. The water-soluble polysulfone of claim 1 wherein the mixture of ethylenically unsaturated monomers consists essentially of:
(1) 2 to 20 mole percent of sulfoethyl acrylic acid and water-soluble monovalent cation salts thereof; and
(2) 98 to 80 mole percent of amonoallyl ether of a polyoxyethylene glycol having an average molecular weight in the range from 400 to 700.

No references cited.

JOSEPH L. SCHOFER, *Primary Examiner.*

D. K. DENENBERG, *Assistant Examiner.*